(No Model.)
P. B. DELANY.
ELECTRICAL SYNCHRONOUS MECHANISM.
No. 286,281. Patented Oct. 9, 1883.
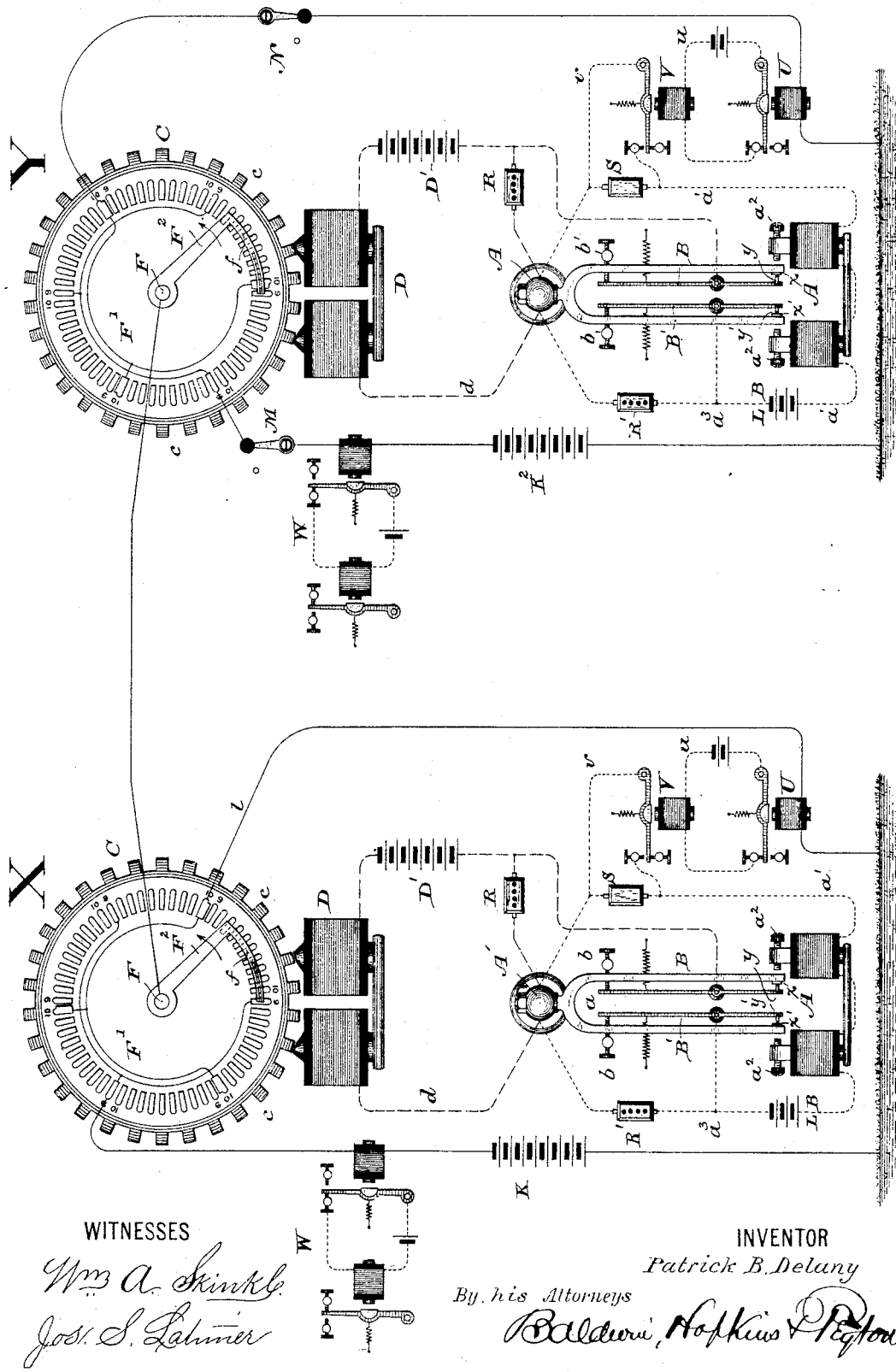
WITNESSES
Wm. A. Skinkle
Jos. S. Latimer
INVENTOR
Patrick B. Delany
By his Attorneys
Baldwin, Hopkins & Peyton

UNITED STATES PATENT OFFICE.

PATRICK B. DELANY, OF NEW YORK, N. Y., ASSIGNOR TO THE STANDARD ELECTRIC MANUFACTURING COMPANY, OF SAME PLACE.

ELECTRICAL SYNCHRONOUS MECHANISM.

SPECIFICATION forming part of Letters Patent No. 286,281, dated October 9, 1883.

Application filed August 6, 1883. (No model.)

*To all whom it may concern:*

Be it known that I, PATRICK B. DELANY, a citizen of the United States, and a resident of the city, county, and State of New York, have invented certain new and useful Improvements in Electrical Synchronous Mechanism, of which the following is a specification.

My invention has special reference to that class of apparatus shown and claimed in an application for Letters Patent filed by me April 12, 1883, serially numbered 91,489; and the general organization of the apparatus illustrated in the drawings attached hereto is the same as that set forth in said application, with two exceptions, which constitute the subject-matter of my present invention, and are hereinafter specifically described.

My invention consists in an improved means of controlling the motor-circuit at each station, so as to vary the speed of the actuating apparatus at each station, and, second, an arrangement by which the operator in charge at one station can tell when correcting-impulses of electricity leave his station to correct the speed of the apparatus at the distant station.

In the accompanying drawings, Figure 1 is a diagrammatic plan view of two electrically-connected stations arranged according to my invention.

The two stations X and Y are connected by a main line and circuit-breaker, consisting in this instance of a vibrator-fork, $a$, at each station, which is automatically vibrated by a local battery, L B, and magnet A, the circuit of this local battery being marked $a'$ and indicated by the fine dotted lines. The poles of the vibrator-magnet A are provided with extension-screws $a^2$, of magnetic metal, so that they may be approached to or withdrawn from the tines of the fork to regulate their rate of vibration. Platinum contacts $x$ $x'$ on the inner faces of the fork-tines make and break contact with spring-fingers $y$ $y'$, carried by adjustable insulated arms or levers B B', pivoted upon the bed-plate of the apparatus, and adjusted by thumb-screws $b$, against which they are drawn by spiral springs. The local circuit indicated by the fine dotted line runs from the positive pole of the battery through the coils of the vibrator-magnet to the head of the fork, and through contacts $x'$ $y'$ to the insulated lever B', and thence back to the opposite pole of the battery. A resistance, R', is placed around the contacts $x$ and $y$, to prevent sparking, being run from the point $a^3$ to the head of the fork. When the fork is mechanically started into vibration, its local circuit will be made and broken in the ordinary way, and its vibration maintained continuously. The contact $x$ on the opposite tine of the fork makes and breaks contact with the finger $y$ as the fork vibrates, thus opening and closing a local circuit containing a battery and magnet which continuously rotate the transmission apparatus C. This motor-circuit is indicated by broken lines, and runs from the positive pole of the battery D' to lever B, contact-finger $y$, contact $x$, head A' of the fork, and, by wire $d$, through the coils of the motor-magnet D D to the opposite pole of the battery. A resistance, R, is thrown around the contacts $x$ $y$, to prevent sparking.

The rotary transmission apparatus C, which is provided with armature-teeth $c$, is actuated by the magnet D D. This apparatus consists of a stationary table of contacts, F', arranged concentrically around the vertical rotating shaft F, which is driven by the armature-wheel C and is connected with the line. A trailing finger or circuit-completer, $f$, which traverses the contacts, is carried by a radial arm, F², projecting from the shaft. It is deemed unnecessary further to describe this apparatus, as it is fully illustrated and described in detail in my application for improvements in telegraphy, filed April 12, 1883, serially numbered 91,493.

I have shown sixty contact-pieces in the circular table of contacts, which are numbered from 1 to 10 in six independent sets or series. These contacts, except those numbered 9 and 10, may be connected in any suitable order or groups for any purpose desired, as fully set forth in my two applications above mentioned. When the trailing contact-fingers $f$ at both stations are upon the contacts bearing the same number, the corresponding instruments, whatever they may be, connected to these contacts at each station will be placed in communication over the line, and as the fingers at both stations continue to move synchronously they will pass to the next contact, successively, over all the contacts at each station. During the moment when the moving fingers are upon the correspondingly-numbered contact-pieces at each station, the circuit from the contact at one station to that at the other is complete and independent of all the other circuits.

In order to maintain the synchronous movement of the apparatus at both stations, I arrange the 9 and 10 contacts as follows: At station X three of the 9's farthest removed from each other are connected together and to a battery, K, and that three of the 10's farthest removed from each other are connected to each other and to line $l$, which leads to the correcting and regulating devices, which will be hereafter described. The remaining three intermediate 9's and 10's are unconnected with any circuit. At station Y the 9's corresponding to those connected with the battery at station X are unconnected, while the alternate 9's are connected with the battery $K^2$; and the 10's at Y which are connected with each other and with the correcting devices through the line $l$ correspond with those which are unconnected with station X, the remaining 10's at Y being unconnected. At both stations the three 10's which are connected with the correcting devices through the line $l$ are built out or extended toward the adjoining 9's which are not connected with any circuit.

Thus far the organization described is precisely similar to that set forth in my two applications above mentioned. When the trailing contact-fingers at both stations are moved synchronously, so long as they rest upon correspondingly-numbered contacts at the same moment, there will be no occasion for correction of either apparatus. If the apparatus at Y, however, runs a trifle faster than that at X, the finger $f$ at station Y will touch the extended side of a 10 contact, while the finger at X is still on a battery-connected 9. An impulse of electricity will be sent from the battery K, at station X, over the line and through the contact 10 and line $l$, to the correcting devices at that station. Exactly the same operation occurs if the apparatus at X moves faster than that at Y. The means for utilizing these correcting-impulses to control the speed of the apparatus at the station receiving them constitutes the first part of my present invention.

The apparatus is shown as organized for the transmission of retarding impulses from one station to another, and I make them effective by cutting a resistance out of the vibrator-circuit whenever a correcting impulse is received. The effect of this is to increase the electro-motive force of the local vibrator-circuit and the power of the electro-magnets A, so that they act upon the tines of the fork with a greater force, thus increasing the amplitude of vibrations but slowing the rate. This retardation of vibration will of course effect the speed with which the motor circuit is made and broken, and consequently retard the rotation of the trailing finger.

The vibrator local circuit (indicated by the fine dotted line) works ordinarily through an adjustable box of resistances, S. When the apparatus at one station runs too fast, however, and a correcting impulse of electricity is received through the main line and line $l$, the relay U in that line is energized, so that its armature is drawn from its back stop, thus breaking its local circuit $u$ and permitting the armature of a second electro-magnet V to fall to its back stop, which completes a shunt-circuit, $v$, around the resistance S, so as to cut it out of the vibrator-circuit. The electro-motive force of the vibrator-circuit is therefore momentarily increased, the vibration of the fork momentarily retarded, and the rotation of the trailing finger slowed so that it drops back upon the proper contact.

The operation of the apparatus is the same at both stations. The operator at either station can always tell when the correcting impulse is received by the stroke of the relay V. In order to enable him also to know when the correcting impulse is sent from his station to the distant station, I place a relay and sounder, W, in the correcting-battery circuit at each station between the 9-contacts and the ground. Both operators can therefore tell the way the apparatus is working, and which is running faster than the other.

In starting the apparatus, the instrument at X is put in motion by starting the vibrator and imparting an impulse of rotation to the vertical shaft F, and the adjustment of the two apparatus is completed at station Y. At that station the operator also starts his apparatus and closes the switches M N. By means of the relay V, which cuts the resistance out of the fork-circuit, and sounder W, controlled by the relay in the circuit of the battery K, from which correcting impulses are sent to the distant station, the operator can tell which apparatus is running faster, and can adjust his own apparatus until the absence of any stroke on the two tell-tales indicates that the apparatus at the two stations are running synchronously. The box of resistances S may of course be provided with plugs or any other means for regulating the amount of resistance normally included in the local circuit.

While I have described my present invention with special reference to one form of apparatus, it is obvious that the invention is adapted to the sending of accelerating impulses as well as retarding impulses, and that it may be applied also to the organizations shown in other applications in electrical synchronous movements filed by me April 12, 1883, and serially numbered 91,490, 91,491, and 91,492.

It will be observed that when a correcting impulse of electricity actuates the relay U the moment the relay-armature leaves its back stop the local circuit $u$ is broken, and the armature of the second relay, V, is instantaneously drawn to its back stop, thus completing the shunt around the resistance S. The adjustment of the armature of the relay U is very delicate, so that it responds immediately to any correcting impulse, while the spring of the armature of the relay V is of comparatively high tension, so that it moves to its back stop instantaneously. This plan of making the correcting impulse effective when the armature of the relay U leaves its back stop I consider very important, as the corrections are practically instantaneously made effective, whereas, if they were not made effective until the armature of the relay had been drawn to its front stop, the action of the correcting devices would be sluggish. This feature of my invention is not limited to the intervention of the relay V between the first relay and the shunt-circuit, nor to any particular manner of utilizing the correcting impulses; but I consider my invention broadly to consist in the feature of making the correcting impulses effective when contact with the back stop of the relay is broken.

In my prior application filed April 12, 1883, and serially numbered 91,489, above referred to, I have described the way in which the apparatus at the two stations is brought into synchronism by a rather exact manipulation of the devices. I have found in practice, however, that where the apparatus at the two stations is running at approximately the same speed within liberal limits, and the switches all closed, (and this the operators can readily tell by the strokes on the tell-tales,) that the apparatus will of itself, in a few moments, come into synchronism without the intervention of the operators.

It will be apparent that if the circuit-completer at one station is traveling more rapidly than that at the other, its excess of speed soon causes it to overtake the circuit-completer at the other station and bring them both into such relation to the battery-connected 9's and correcting 10's that the correcting impulses will thereafter maintain them in the correct position.

Any subjects-matter herein shown or described, but claimed in cases 91,488, 91,489, 91,490, 91,491, 91,492, or 91,493, filed April 12, 1883, are disclaimed herein.

I claim as my invention—

1. The combination, substantially as set forth, of electrically-controlled sychronous apparatus with means for automatically changing the resistance of the circuit which controls the movement of said apparatus whenever a correcting impulse of electricity is received.

2. The combination, substantially as set forth, of synchronously-actuated apparatus, a correcting-battery at one station, means for transmitting a correcting impulse of electricity to a distant station whenever the apparatus at said distant station runs out of time with that at the first station, and an indicator or sounder placed in the correcting battery-circuit at the first station to indicate when correcting impulses of electricity are sent from that battery.

3. The combination, substantially as set forth, with synchronous electrically actuated and controlled apparatus, of devices for indicating when controlling or correcting impulses of electricity are received from a distant station, and also when correcting impulses of electricity are transmitted to a distant station.

4. The combination, substantially as set forth, of electrically-controlled synchronous apparatus, means for automatically correcting the speed of said apparatus at one station by a correcting impulse of electricity when it runs out of time with that at a distant station, and a relay worked by the correcting impulses, which makes such correcting impulses effective upon the apparatus to be corrected when the relay-armature leaves its back stop.

5. The combination, substantially as set forth, of electrically-controlled synchronous apparatus, means for automatically changing the resistance of the circuit which controls the movement of said apparatus whenever a correcting impulse of electricity is received, and a relay which permits such correcting impulse to become effective when the relay-armature leaves its back stop.

In testimony whereof I have hereunto subscribed my name.

PATRICK B. DELANY.

Witnesses:
 NELLIE HOLMES,
 E. C. DAVIDSON.